United States Patent [19]

Godo

[11] 4,205,302
[45] May 27, 1980

[54] WORD RECOGNIZING SYSTEM

[76] Inventor: Einar Godo, 2407 170th Pl., SE., Bellevue, Wash. 98008

[21] Appl. No.: 964,473

[22] Filed: Nov. 29, 1978

Related U.S. Application Data

[63] Continuation of Ser. No. 846,384, Oct. 28, 1977, abandoned, which is a continuation-in-part of Ser. No. 652,220, Jan. 26, 1976, abandoned.

[51] Int. Cl.² .............................................. G06F 7/04
[52] U.S. Cl. ..................... 340/146.2; 340/146.3 WD; 371/67
[58] Field of Search ..................... 340/146.2, 146.1 R, 340/146.1 D, 146.3 Q, 146.3 WD; 178/69.1; 179/15 BS

[56] References Cited

U.S. PATENT DOCUMENTS

| | | | |
|---|---|---|---|
| 3,308,434 | 3/1967 | Glasson et al. | 340/146.1 D |
| 3,463,911 | 8/1969 | Dupraz et al. | 340/146.1 R |
| 3,562,710 | 2/1971 | Halleck | 340/146.1 D |
| 3,651,459 | 3/1972 | Hahn | 340/146.1 R |
| 3,760,355 | 9/1973 | Bruckert | 340/146.3 WD |
| 3,801,956 | 4/1974 | Braun et al. | 340/146.2 |
| 3,855,576 | 4/1974 | Braun et al. | 340/146.3 WD |
| 3,879,727 | 12/1974 | East | 340/146.2 |
| 3,942,152 | 3/1976 | Pettersson | 178/69.1 |
| 4,010,445 | 3/1977 | Hoshino | 340/146.3 WD |
| 4,110,737 | 8/1978 | Fahey | 340/146.3 Q |

*Primary Examiner*—Charles E. Atkinson
*Attorney, Agent, or Firm*—Seed, Berry, Vernon & Baynham

[57] ABSTRACT

A stream of digital data containing an unknown word is compared bit by bit with a stored known word. The bit comparisons are counted in such a manner that the maximum output identifies the known word in the data stream. Alternatively, the non-comparing bits may be counted so that a minimum output identifies the known word.

7 Claims, 6 Drawing Figures

|   |   |   |   |   |   |   |   | |
|---|---|---|---|---|---|---|---|---|
|   |   |   | 4 | 3 | 2 | 1 |   | T4 |
|   |   | 4 | 3 | 2 | 1 |   |   | T3 |
|   | 4 | 3 | 2 | 1 |   |   |   | T2 |
| 4 | 3 | 2 | 1 |   |   |   |   | T1 WORD A |

K L M G H I J

|   |   |   |   |   |   |   |   | |
|---|---|---|---|---|---|---|---|---|
|   |   |   | 1 | 2 | 3 | 4 |   | T1 WORD B |
|   |   | 1 | 2 | 3 | 4 |   |   | T2 |
|   | 1 | 2 | 3 | 4 |   |   |   | T3 |
| 1 | 2 | 3 | 4 |   |   |   |   | T4 |

FIG. 1

|   |   |   |   |   |   |   | |
|---|---|---|---|---|---|---|---|
|   |   |   |   |   |   | 4 | T7 |
|   |   |   |   |   | 4 | 3 | T6 |
|   |   |   |   | 4 | 3 | 2 | T5 |
|   |   |   | 4 | 3 | 2 | 1 | T4 |
|   |   | 4 | 3 | 2 | 1 |   | T3 |
|   | 4 | 3 | 2 | 1 |   |   | T2 |
| 4 | 3 | 2 | 1 |   |   |   | T1 WORD A |

C D E F 1 2 3 4   WORD B

WORD RECOGNIZING SYSTEM

This application is a continuation of application Ser. No. 846,384 filed Oct. 28, 1977 which is a continuation-in-part of application Ser. No. 652,220 filed Jan. 26, 1976, both now abandoned.

BACKGROUND OF THE INVENTION

1. Field of the Invention

This invention relates to a digital word recognizing system, and more particularly to a real time system for recognizing variable length words serially transmitted in a data stream.

2. Description of the Prior Art

Word recognizing systems for identifying known words in a data stream are in conventional use. However, these prior art systems are generally of limited value principally because of their inability to handle large, variable length words as well as their inability to perform the word recognizing function in real time. The capacity of conventional systems has generally been limited to words of only a few hundred bits, and it usually has been necessary to know the location of the work in the incoming data stream. Also, these systems rely on mathematical analysis to perform the word recognizing function. Consequently, they are incapable of operating in real time and thus they are fairly slow because of the computing and data processing required. Furthermore, propagation delays have been experienced through all the stages between each step in entering data in serial or parallel form.

SUMMARY OF THE INVENTION

It is an object of the invention to provide a real time word recognizing system having a recognition rate which is equal to the data clock rate.

It is another object of the invention to provide a real time work recognizing system which is easily expandable to handle virtually any length word and accuracy.

It is still another object of the invention to provide a system which is capable of recognizing words in a data stream without prior knowledge of the location of the word in the data stream.

It is a further object of the invention to provide a word recognizing system that is capable of operating with correlation errors approaching zero regardless of word length.

These and other objects of the invention are accomplished by comparing the incoming data stream bit for bit against a known word stored in a register. The results of the comparisons are summed so that either a maximum positive comparison or a minimum negative comparison identifies the known word in the data stream. Since the system operates in real time, the word is detected by the time it has serially clocked through the system so that the speed limitation is that of the clock data rate and word length rather than the throughput capacity of the system. In a first embodiment the location of the word in the data stream is not known, and the data stream is clocked along a shift register in one direction while the known word is recirculating clocked through another shift register in the opposite direction. In a second embodiment the location of the word in the data stream is not known and the bit by bit comparison is made with the known data word remaining stationary in internal registers. The comparison is then made between corresponding registers in the respective shift registers.

BRIEF DESCRIPTION OF THE FIGURES OF THE DRAWINGS

FIG. 1 is a schematic illustrating the concept of the first embodiment of the invention.

FIG. 2 is a schematic illustrating the concept of the second embodiment of the invention.

DETAILED DESCRIPTION OF THE PREFERRED EMBODIMENT

Referring to FIG. 1, the first bit of a know word B circulating in a shift register clocked to the left, meets the first bit of an unknown word A in a comparator G. FIG. 1 shows how the two words meet bit for bit from bit 1 to bit 4 from time T1 to time T4. As explained hereinafter, the output of the comparator is connected to a counter which counts the number of positive comparisons between bits (i.e. matching bits) or the number of negative comparisons between bits (i.e. non-matching bits). In FIG. 1, the incoming word in the data stream meets the stored word at the comparator G. However, the first bits of the two words could have met at any of the comparators and the result would have been the same. Therefore, a word can be recognized from a stream of data by summing the positive or negative bit for bit comparisons to determine how well the incoming word matches the stored word.

Figure 3:
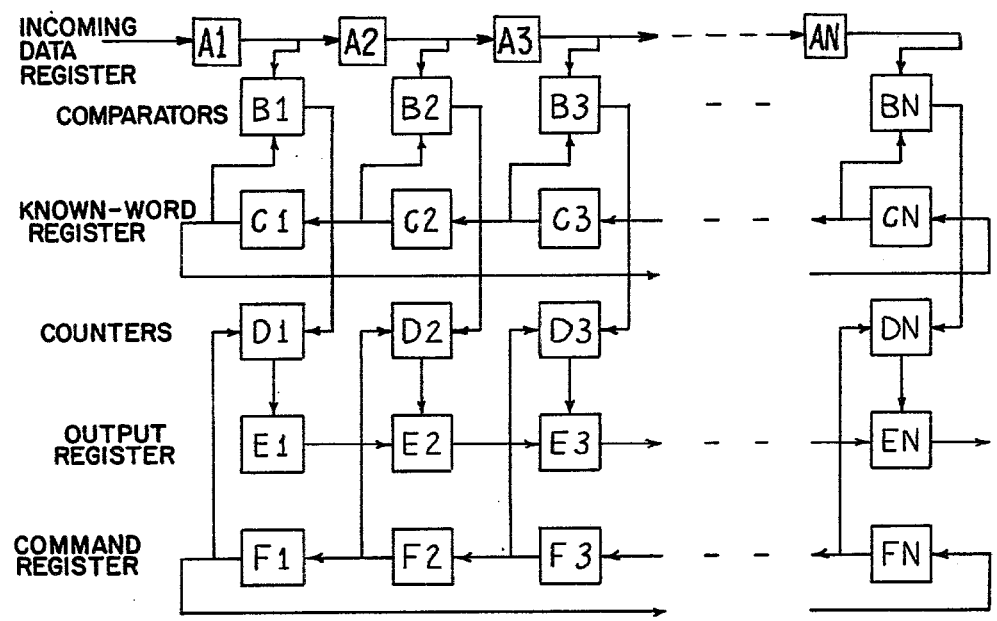
FIG. 3 is a block diagram illustrating a system for implementing the concept of FIG. 1.

A block diagram of a system for implementing the concept explained above and shown in FIG. 1 is illustrated in FIG. 3. The known word is clocked to the left and recirculated through shift registers C1, C2, C3 - - - CN. The incoming data is clocked to the right through shift registers A1, A2, A3 - - - AN. The outputs of corresonding registers AN and BN are compared by respective comparators B1, B2, B3 - - - BN. The bit by bit comparison of the two words from the comparators B1, B2 - - - BN are counted by respective counters D1, D2, D3 - - - DN, each counter being able to count to N. Outputs from shift registers F1, F2, F3 - - - FN are connected to the reset inputs of respective counters D1, D2, D3 - - - DN. The shift registers F1, F2, F3 - - - FN are connected in recirculating fashion, and all but one of the register contain a logic "0". One of the registers contains a "1" which is shifted through the registers F1, F2, F3 - - - FN in synchronism with the first bit of the known word in the registers C1, C2, C3 - - - CN. The "1" sequentially resets respective counters D1, D2, D3 - - - DN and loads the outputs of the counters into respective output registers E1, E2, E3 - - - EN. Thus, just before the first bit of the word reaches each register C1, C2, C3 - - - CN the corresponding counter D1, D2, D3 - - - DN is reset and its contents are loaded into its respective register E1, E2, E3 - - - EN. The information in the output registers E1, E2, E3 - - - EN is transferred to an external processor (not shown) which examines the contents of each of the registers E1, E2, E3 - - - EN to determine if they indicate a word match. Utilizing the example of FIG. 1 and assuming that the G comparator (FIG. 1) corresponds to comparator B2 (FIG. 3), the number of register E2 would be 4 (to indicate 4 matching bits). Since the word is 4 bits in length a 4 output from register E2 indicates that the known word has been received in the incoming data stream.

Figure 5:
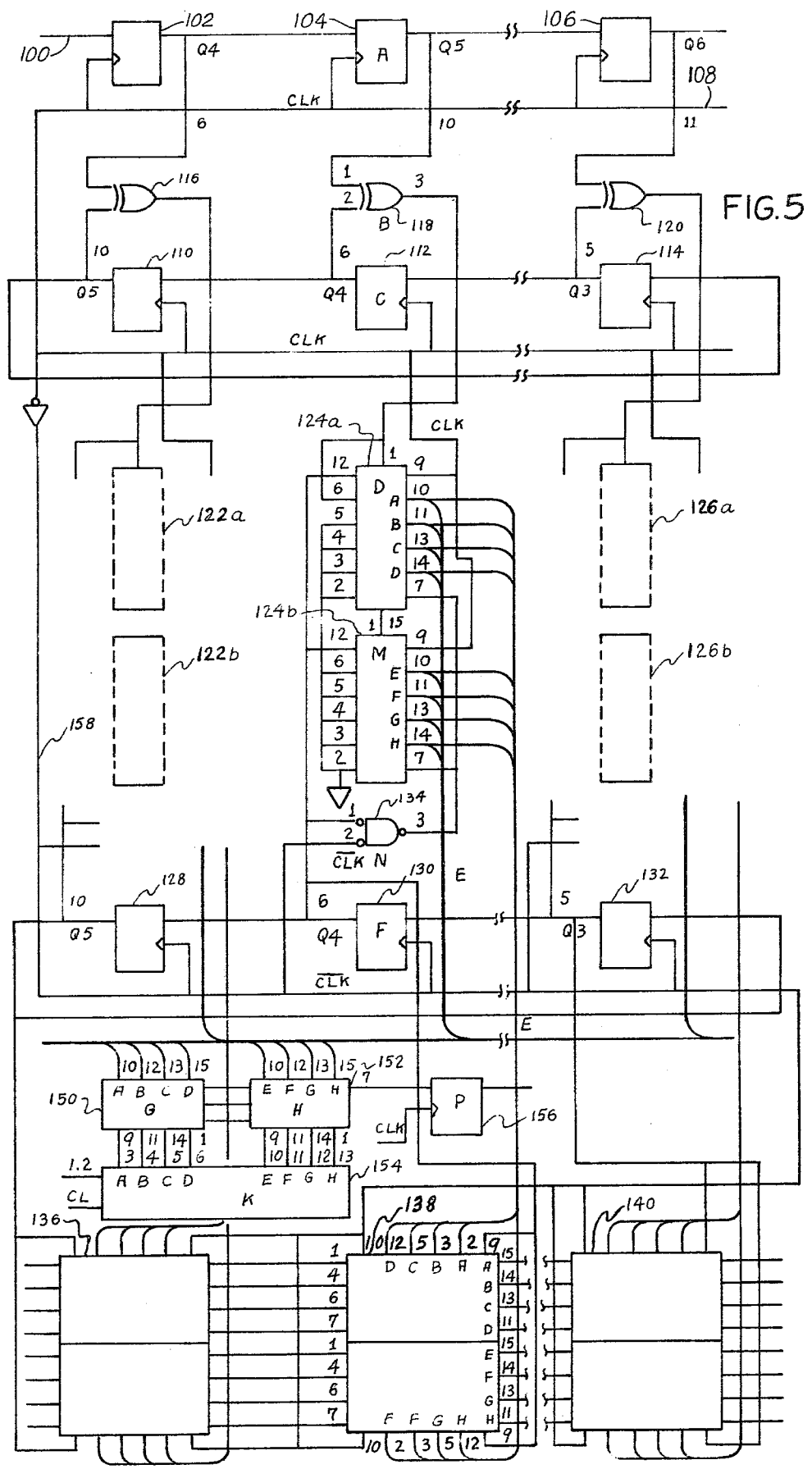
FIG. 5 is an electrical schematic of one system corresponding to the block diagram of FIG. 3.

A schematic illustrating one embodiment of a circuit for the block diagram of FIG. 3 is illustrated in FIG. 5. The data stream is received on a line 100 and is sequentially shifted through a plurality of cascaded flip-flops 102, 104, 106 in accordance with clock pulses on line 108. The flip-flops 102, 104, 106 correspond to the A registers of FIG. 3. Similarly, the known word recirculates through flip-flops 110, 112, 114 in accordance with the clock pulses so that the data stream is shifted to the right through flip-flops 102-106 in synchronism with the recirculation of the known word through flip-flops 110-114 to the left. The outputs of corresponding data stream flip-flops 102-106 and known word flip-flops 110-114 are received by respective exclusive-OR gates 116, 118, 120 which produce a logic "1" whenever both of their inputs are identical. The exclusive-OR gates 116-120 increment respective cascaded counters 122, 124, 126. The counters 122-126 are incremented once each time the exclusive-OR gates 116-120 detect a bit match.

A second recirculating shift register formed by flip-flops 128, 130, 132 is utilized to sequentially reset each of the counters 122-126 as the first bit of the known word reaches the corresponding known word flip-flops as explained above. Accordingly, only one of the flip-flops 128-132 contains a "1" while the remainder of the flip-flops 128-132 contain zero. The one is sequentially clocked through the flip-flops 128-132 by the clock pulse on line 156. For example, a "1" at the Q output of flip-flop 130 resets counter 124 through AND gate 134 between clock pulses. The "1" is then shifted to flip-flop 128 to reset counter 122 between the next two clock pulses. Thus, for example, when the "1" is shifted from flip-flop 130 to flip-flop 128 just after counter 124 has been reset, the first bit of the known word is shifted into flip-flop 112. As the counters 122-126 are reset, their contents are loaded into respective registers 136, 138, 140 which corresponds to the registers E of FIG. 3. The comparison count in registers 136-140 are then serially transferred to an external device by clock pulses on line 156.

As an alternative to loading data from the counters 122, 124, 126 into the registers 136, 138, 140, the data can be loaded onto a tri-state bus connected to one set of inputs of comparators 150, 152. The other set of inputs to the comparators 150, 152 receives the output of a register 154 containing a number corresponding to the number of bits in the known word which has been entered into the register by conventional means. A match between the number in the register 154 and the number on the tri-state bus indicates that the known word has been received.

In a second embodiment the bits of the known word remain stationarily stored in respective registers while the unknown word is clocked through a shift register. Referring to FIG. 2, the first bit of a known word B stationary in a register, matches the first bit of an unknown word A in a comparator C at time T1. At time T2 we see that no bit in the incoming word matches any bit of the stationary, knwon word. At time T3, bit 2 of the stationary matches word bit 2 of the incoming word at comparator D. As the clocking of the incoming data continues, a bit of the incoming word matches a bit of the stationary word in one of the registers during times T1, T3, T5 and T7. At times T2, T4 and T6 none of the bits of the incoming word match any bit of the stationary word. In order to detect incoming words which first reach the first register C during even times an additional set of comparitors and counters is required. The additional set compares and counts while the first set transfers data to the next register. As in the example of FIG. 1, when the matching bits are counted and the maximum output identifies the known word. When non-matching bits are counted the minimum output identifies the known word.

A block diagram of a system for implementing the concept shown in FIG. 2 and explained above is illustrated in FIG. 4. The incoming stream of unknown data is clocked to the right through shift register A1, A2, A3 - - - AN, and the known word is stored in registers C1, C2, C3 - - - CN. The bit by bit comparison is done by respective comparitors B1, B2, B3 - - - BN. The comparitors B1, B2, B3 - - - BN increment respective counters D1, D3, D5 - - - DN and D2, D4, D6 - - - D(N+1). One set of counters D2, D4, D6 - - - D(N+1) is enabled during even time periods T2, T4, T6 - - - T(N+1). When the even set of counters D2, D4, D6 - - - D(N+1) is enabled the counts stored in the odd set of counters D1, D3, D5 - - - DN are shifted to the right. Similarly, when the odd set of counters D1, D3, D5 - - - DN is enabled the counts stored in the even set of counters D2, D4, D6 - - - D(N+1) are shifted to the right. When the count initially stored in the first counter of each set D1, D2 is shifted out of the last counter for each set DN, D(N+1), respectively, a count from either of the counters DN, D(N+1) equal to the number of bits in the known word indicates the known word has been received in the incoming data stream.

Figure 4:
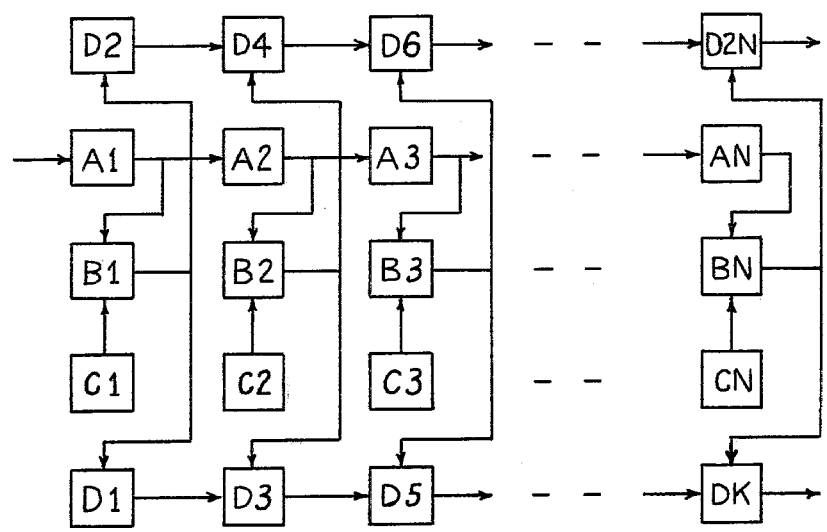
FIG. 4 is a block diagram illustrating a system for implementing the concept of FIG. 2.
Figure 6:
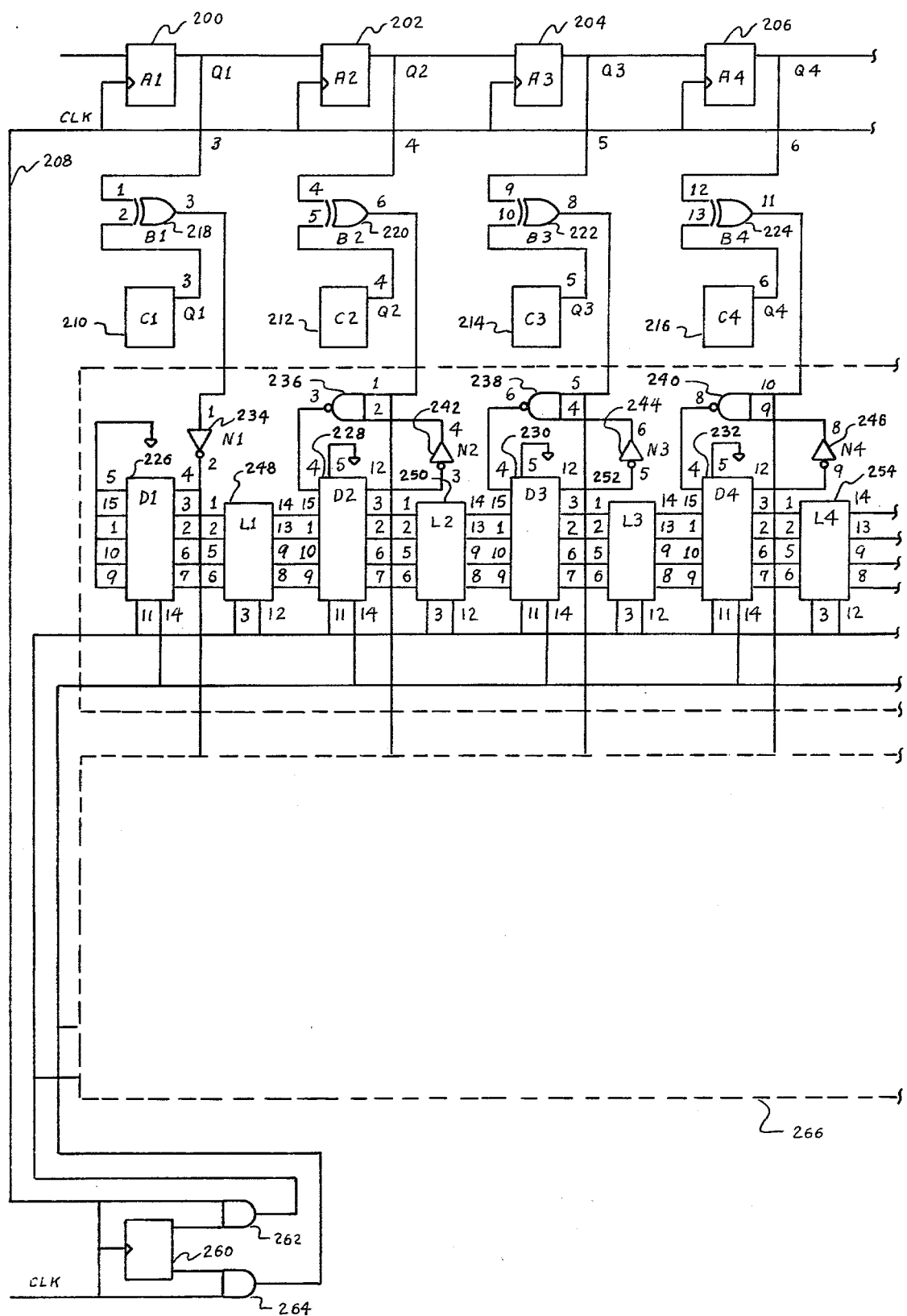
FIG. 6 is an electrical schematic of one system corresponding to the block diagram of FIG. 4.

One embodiment for implementing the system of FIG. 4 is illustrated in FIG. 6. The incoming data is shifted to the right through a shift register formed by flip-flops 200, 202 204, 206 in accordance with clock pulses received on line 208. The known word is stored in a register composed of flip-flops 210, 212, 214, 216. The outputs of corresponding flip-flops 200, 210; 202, 212; 204, 214; 206, 216; are compared by exclusive-OR gates 218, 220, 222, 224, respectively. The outputs of the exclusive-OR gates 218-224 are applied to respective counters 226, 228, 230, 232, respectively, through inverter 234 and NAND gates 236, 238, 240. The inputs to NAND gates 236, 238, 240 are disabled by inverters 242, 244, 246, respectively when the counters have incremented to their maximum value. The CLK pulses toggle a flip-flop 260 which alternately enables NAND gates 262, 264 to provide alternate clock pulses at their respective outputs. The counters 226-232 are enabled during the alternate clock pulses from NAND gate 262 so that matching bits indicated by the exclusive-OR gates 218-224 can increment the counters 226-232 during those times. During alternate clock pulses from NAND gate 262 the contents of the counters 226-232 are shifted one step to the right from respective temporary storage latches 248, 250, 252, 254 by the alternate clock pulses at the output of NAND gate 264 in order to accomplish the data transfer. A second set of counters and latches 266 operates out of phase with the first set. The first set of counters and latches corresponds to the odd counters D1, D3, D5 - - - DN of FIG. 4 while the second set of counters and latches 266 corresponds to the even counter D2, D4, D6 - - - D(N+1) of FIG. 4.

It will be understood that either embodiment of the invention may be stacked, i.e., several word recognizing systems may be placed in parallel to receive data transmitted over a number of lines in parallel.

A large word can be from 100 to 1,000 bits, and up to 10,000,000 bits, and a special purpose TV picture may have 3,000,000 bits of analog data. For detecting a 10,000 bit item from a 300,000 bit TV picture, quick reading and tracking of a 1,000 to 2,000 bit of good contrast data may be adequate to quickly locate the item and then the 10,000 bit item can be detected.

The embodiments of the invention in which a particular property or privilege is claimed are defined as follows:

1. A method of recognizing a word containing a number of bits in a data stream, comprising:

recirculating a known word in a first shift register clocked in a first direction;

clocking said data stream through a second shift register in a direction opposite from said first direction;

comparing each bit of the known word stored in a respective stage of said first shift register with a bit of said data stream stored in a corresponding stage of said second shift register;

counting the number of comparing bits for each stage of registers during a plurality of clocking periods to determine if said word has been received in said data stream.

2. The method of claim 1 further comprising:

providing a signal for resetting the counter and transferring the output from the counter to an output register by a command signal from a third serial register clocked is said first direction is synchronism with said known word;

clocking the contents of said output registers in a direction opposite said first direction and determining the maximum output of the output register to identify the known word in said stream of data.

3. The method of claim 1 further including:

recirculating a command bit through a third shift register in said first direction in synchronism with the first bit of said word;

transferring the count of matching bits for each stage of registers to responsive output registers and resetting the count for each stage to zero responsive to receipt of said command bit at each stage; and determining when the count stored in one of said output registers equals the number of bits forming said word thereby providing an indication that said word has been received.

4. A method of recognizing a word formed by a number of bits in a data stream, comprising:

clocking said stream of data through a shift register;

storing a known word in a storage register;

comparing each bit of the known word stored in a respective stage of said storage register with a bit of said data stream stored in a corresponding stage of said shift register for each clock period as said data is clocked through said shift register;

counting the number of matching bits for each stage of registers in a first group during alternate clocking periods and in a second group during the remaining clock periods; and determining when the count in either the first or second group equals the number of bits forming the word.

5. An apparatus for recognizing a word formed by a number of bits in a data stream comprising:

a first shift register having its output connected to its input such that data stored therein may be continuously recirculated, said shift register having a number of stages equal to the number of bits forming said word with each stage containing one of said bits;

a second shift register having the same number of stages as said first shift register, said second shift register receiving said data stream at its input;

clock means connected to said first and second shift registers for recirculating said word through said first register and clocking said data stream through said second shift register;

respective comparator means receiving the outputs of each stage of said first shift register and the corresponding stage of said second shift register;

counter means receiving the outputs of said comparator means for counting the number of matching bits stored in corresponding stages of said first and second registers during a plurality of clocking periods to determine when said count equals the number of bits forming said word thereby providing an indication that said word has been received in said data stream.

6. The apparatus of claim 5 further including means for resetting said counters, comprising:

an output register having a number of stages equal to the number of stages of said counter means with each stage receiving the output of a corresponding stage of said counter means responsive to a signal received on an output register load terminal;

a third shift register having its output connected to its input and being incremented by said clock means such that data contained therein is continuously recirculated, said shift register having a number of stages equal to the number of stages of said counter with their outputs connected to the reset terminal of a corresponding stage of said counter means and to the load terminal of a corresponding stage of said output register, said third shift register containing a single bit recirculating in synchronism with the first bit of said word, said bit being capable of resetting said counter means and loading the outputs of said counter means into said output register; and means of examining the contents of said output registers for a number equal to the number of bits forming said known word thereby providing an indication that said word has been received.

7. An apparatus for recognizing a word formed by a numbe of bits in a data stream, comprising:

a storage register having a number of stages equal to the number of bits forming said word with each stage containing one of said bits;

a shift register having the same number of stages as said storage register, said shift register receiving said data stream at its input;

respective comparator means receiving the outputs of each stage of said storage register and the corresponding stage of said shaft register;

clock means connected to said shift register for clocking said data stream through said shift register;

first and second counter means receiving the outputs of said comparator means for counting the number of matching bits stored in corresponding stages of said storage register and said shift register during a purality of clocking periods;

control means receiving the output of said clock means for alternately enabling said first and second counter means during alternate clock periods; and output means for determining when the count in either the first or second counter equals the number of bits forming the word.

* * * * *